United States Patent [19]
Maue et al.

[11] Patent Number: 6,075,298
[45] Date of Patent: Jun. 13, 2000

[54] ROTARY AND LINEAR TRANSLATION ACTUATOR PERFORMING MULTI-FUNCTIONS IN AN AUTOMOBILE

[75] Inventors: H. Winston Maue, Farmington Hills, Mich.; Robin Mihekun Miller, Ellington, Conn.; Christopher R. Tilli, Westland, Mich.

[73] Assignee: Lear Automotive Dearborn, Inc, Southfield, Mich.

[21] Appl. No.: 08/947,972

[22] Filed: Oct. 9, 1997

[51] Int. Cl.[7] ............................... H02K 7/116; B60S 1/08
[52] U.S. Cl. ............................. 310/12; 310/83; 310/80; 310/209; 310/112; 49/72
[58] Field of Search .................................. 310/12, 20, 80, 310/83, 78, 112, 209; 49/72; 74/89.14, 425; 15/205.16; 318/466

[56] References Cited

U.S. PATENT DOCUMENTS

| | | |
|---|---|---|
| 2,271,207 | 1/1942 | Rhein . |
| 2,345,778 | 4/1944 | Lammeren et al. .................. 310/209 |
| 2,615,945 | 10/1952 | Jaeschke . |
| 2,659,237 | 11/1953 | Wood . |
| 2,722,617 | 11/1955 | Cluwen et al. . |
| 2,953,802 | 9/1960 | Ziegler .................................. 15/250.5 |

(List continued on next page.)

FOREIGN PATENT DOCUMENTS

| | | |
|---|---|---|
| 0 345 002 A2 | 6/1989 | European Pat. Off. . |
| 1281424 | 12/1961 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 43 14 248 A1 | 9/1994 | Germany . |
| 56-22150 | 2/1981 | Japan . |
| 5-86761 | 4/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), Sep. 11, 1992 for JP Patent Publication No. 04151351.

P. 100, *Machine Design*, 60 (1988) Oct. 13, No. 24, Cleveland, Ohio, US.

"Goodheart–Wilcox Automotive Encyclopedia", William K. Toboldt, Larry Johnson, Steven W. Olive, 1989, pp. 723–727.

(List continued on next page.)

*Primary Examiner*—Nestor Ramirez
*Assistant Examiner*—K. I. E. Tamai
*Attorney, Agent, or Firm*—MacMillan, Sobanski & Todd, LLC

[57] ABSTRACT

A multi-functional electronic actuator for actuating multiple independent systems on an automotive vehicle includes a magnet assembly, a rotor mounted within the magnet assembly having an armature and a shaft that rotates when the armature is energized, a device for translating the rotor with respect to the magnet assembly, and devices for actuating a first independent system on the automotive vehicle utilizing the rotational motion of the shaft and for actuating a second independent system on the automotive vehicle utilizing the translation of the rotor shaft with respect to the magnet assembly. Two methods for translating the rotor with respect to the magnet assembly are described as well as various linkages that may be used to actuate the independent systems on the automotive vehicle.

12 Claims, 7 Drawing Sheets

U.S. PATENT DOCUMENTS

| | | | |
|---|---|---|---|
| 2,959,803 | 11/1960 | Ziegler . | |
| 3,163,791 | 12/1964 | Carlson | 310/209 |
| 3,184,933 | 5/1965 | Gaugler | 68/23 |
| 3,361,005 | 1/1968 | Carpenter . | |
| 3,361,947 | 1/1968 | Schlebusch . | |
| 3,421,380 | 1/1969 | Mansour . | |
| 3,442,146 | 5/1969 | Simpson . | |
| 3,443,442 | 5/1969 | Schweihs . | |
| 3,443,455 | 5/1969 | Zugel . | |
| 3,516,610 | 6/1970 | Stevens | 239/284 |
| 3,523,204 | 8/1970 | Rand . | |
| 3,574,882 | 4/1971 | Petry . | |
| 3,619,676 | 11/1971 | Kawakami . | |
| 3,659,128 | 4/1972 | Danek . | |
| 3,665,772 | 5/1972 | Beard et al. . | |
| 3,688,332 | 9/1972 | Bellware . | |
| 3,689,817 | 9/1972 | Elliott . | |
| 3,694,723 | 9/1972 | Schneider et al. . | |
| 3,705,520 | 12/1972 | Carpenter | 15/250.22 |
| 3,803,627 | 4/1974 | Schuscheng . | |
| 3,858,922 | 1/1975 | Yamanaka . | |
| 3,917,330 | 11/1975 | Quantz . | |
| 3,927,436 | 12/1975 | Inoue et al. . | |
| 4,009,952 | 3/1977 | Badalich et al. . | |
| 4,011,488 | 3/1977 | Hanagan | 318/139 |
| 4,065,234 | 12/1977 | Yoshiyuki et al. . | |
| 4,158,159 | 6/1979 | Orris et al. . | |
| 4,173,055 | 11/1979 | Izumi et al. . | |
| 4,183,114 | 1/1980 | Eden . | |
| 4,259,624 | 3/1981 | Seibicke . | |
| 4,271,381 | 6/1981 | Munz et al. . | |
| 4,309,646 | 1/1982 | Liedtke et al. . | |
| 4,336,482 | 6/1982 | Goertler et al. . | |
| 4,352,299 | 10/1982 | Riggs et al. . | |
| 4,422,522 | 12/1983 | Slavin et al. . | |
| 4,434,678 | 3/1984 | Maus . | |
| 4,450,390 | 5/1984 | Andrei-Alexandru et al. . | |
| 4,478,004 | 10/1984 | Andrei-Alexandru et al. . | |
| 4,492,904 | 1/1985 | Graham . | |
| 4,507,711 | 3/1985 | Ono et al. . | |
| 4,529,900 | 7/1985 | Uzuka | 310/43 |
| 4,553,656 | 11/1985 | Lense . | |
| 4,573,723 | 3/1986 | Morita et al. . | |
| 4,630,178 | 12/1986 | Mugford et al. . | |
| 4,639,065 | 1/1987 | Kohler et al. . | |
| 4,660,698 | 4/1987 | Miura . | |
| 4,674,781 | 6/1987 | Reece et al. . | |
| 4,701,972 | 10/1987 | Saito | 15/250.22 |
| 4,702,117 | 10/1987 | Tsutsumi et al. . | |
| 4,724,760 | 2/1988 | Bubley | 101/115 |
| 4,733,147 | 3/1988 | Muller et al. . | |
| 4,793,640 | 12/1988 | Stewart, Sr. | 292/201 |
| 4,875,053 | 10/1989 | Harada . | |
| 4,878,398 | 11/1989 | Heinrich . | |
| 4,885,512 | 12/1989 | Gille et al. . | |
| 4,893,039 | 1/1990 | Isii . | |
| 4,918,272 | 4/1990 | Nishikawa . | |
| 5,007,131 | 4/1991 | Chevalier et al. . | |
| 5,023,530 | 6/1991 | Ohashi et al. . | |
| 5,045,741 | 9/1991 | Dvorsky . | |
| 5,063,317 | 11/1991 | Bruhn . | |
| 5,182,957 | 2/1993 | Bohmer et al. . | |
| 5,214,440 | 5/1993 | Takahashi et al. . | |
| 5,218,255 | 6/1993 | Horiguchi . | |
| 5,222,775 | 6/1993 | Kato . | |
| 5,228,239 | 7/1993 | Heo . | |
| 5,251,114 | 10/1993 | Cantin et al. . | |
| 5,274,875 | 1/1994 | Chou . | |
| 5,291,109 | 3/1994 | Peter . | |
| 5,315,735 | 5/1994 | I-Shin . | |
| 5,333,351 | 8/1994 | Sato . | |
| 5,355,061 | 10/1994 | Forhan . | |
| 5,355,286 | 10/1994 | Flint . | |
| 5,373,605 | 12/1994 | Austin . | |
| 5,427,345 | 6/1995 | Yamakami et al. . | |
| 5,462,337 | 10/1995 | Yamakami . | |
| 5,519,258 | 5/1996 | Stroven et al. . | |
| 5,528,959 | 6/1996 | Yamakami . | |
| 5,691,586 | 11/1997 | Yonnet et al. . | |
| 5,694,812 | 12/1997 | Maue et al. . | |
| 5,730,028 | 3/1998 | Maue et al. . | |
| 5,844,382 | 12/1998 | Dan | 318/10 |

OTHER PUBLICATIONS

"Automotive Handbook", Bosch 3rd Edition, 1993, pp. 694–697.

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

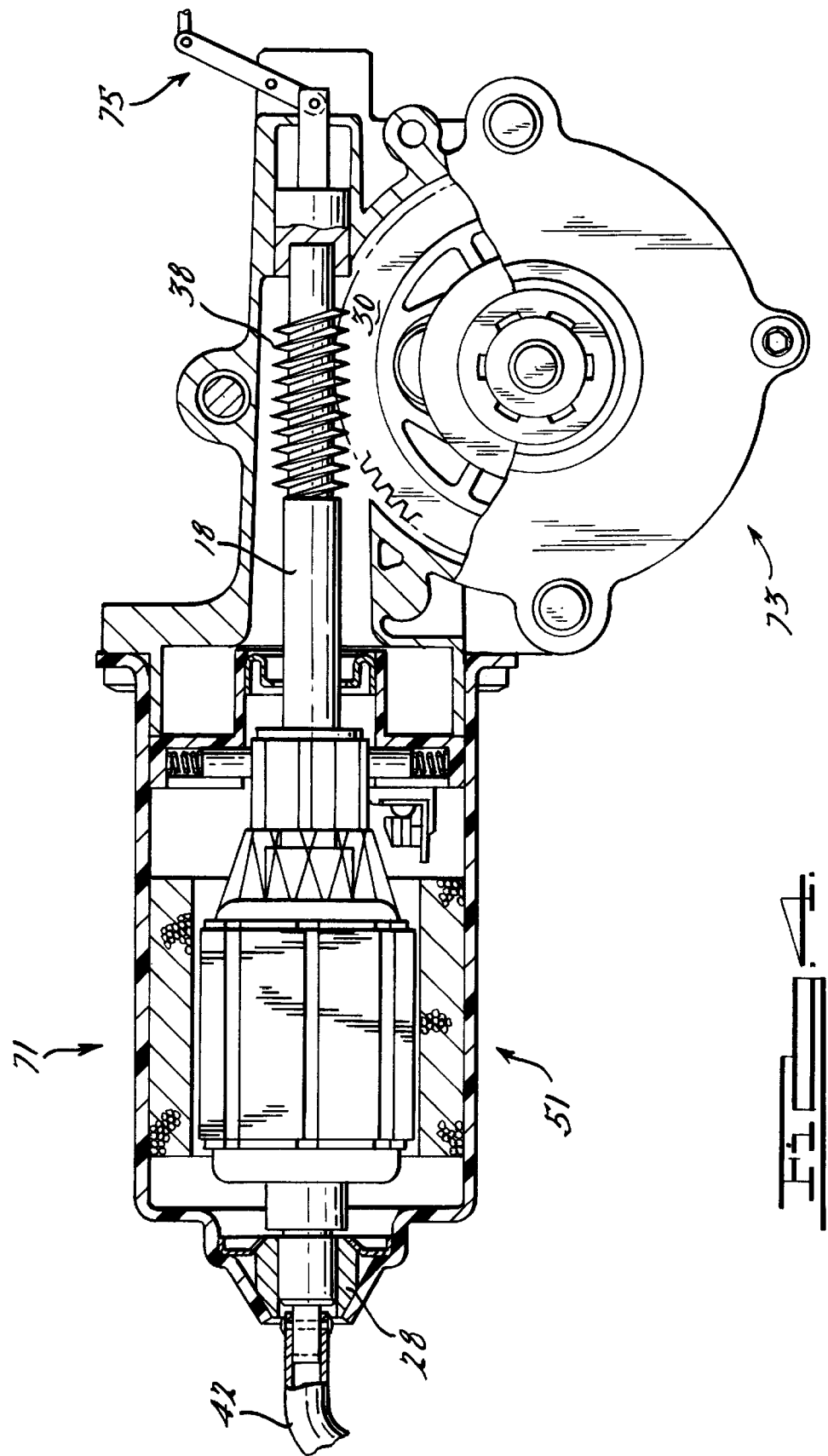

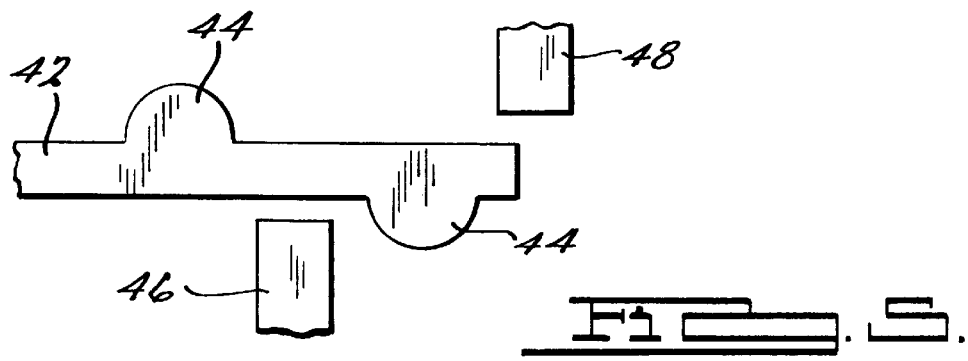
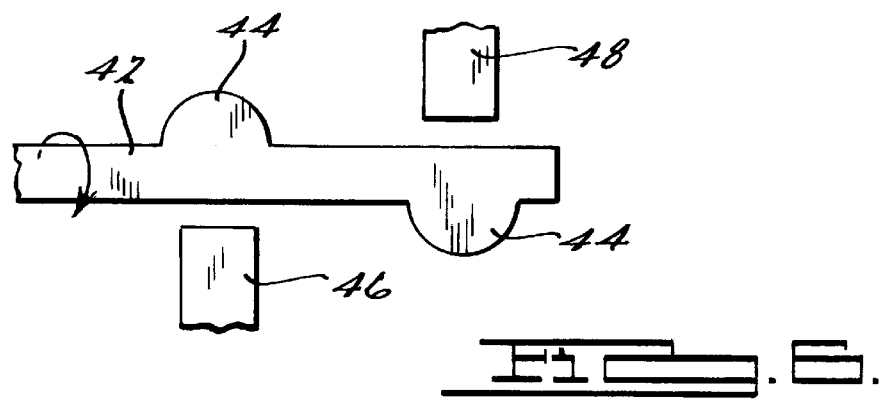
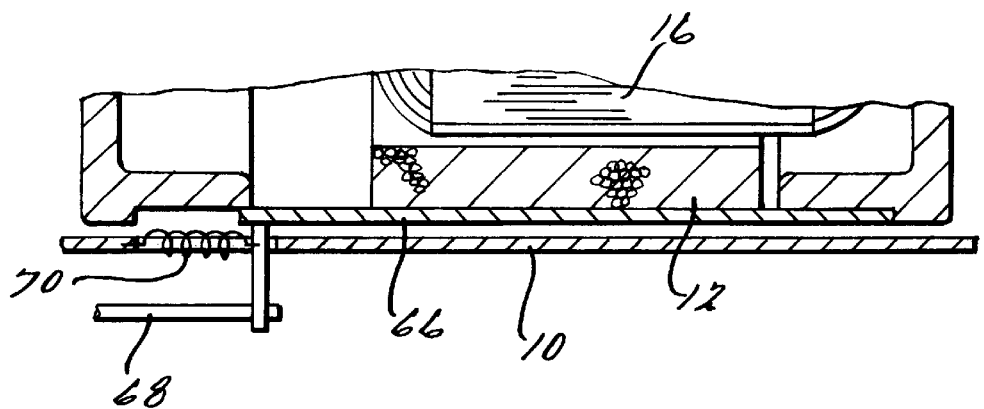

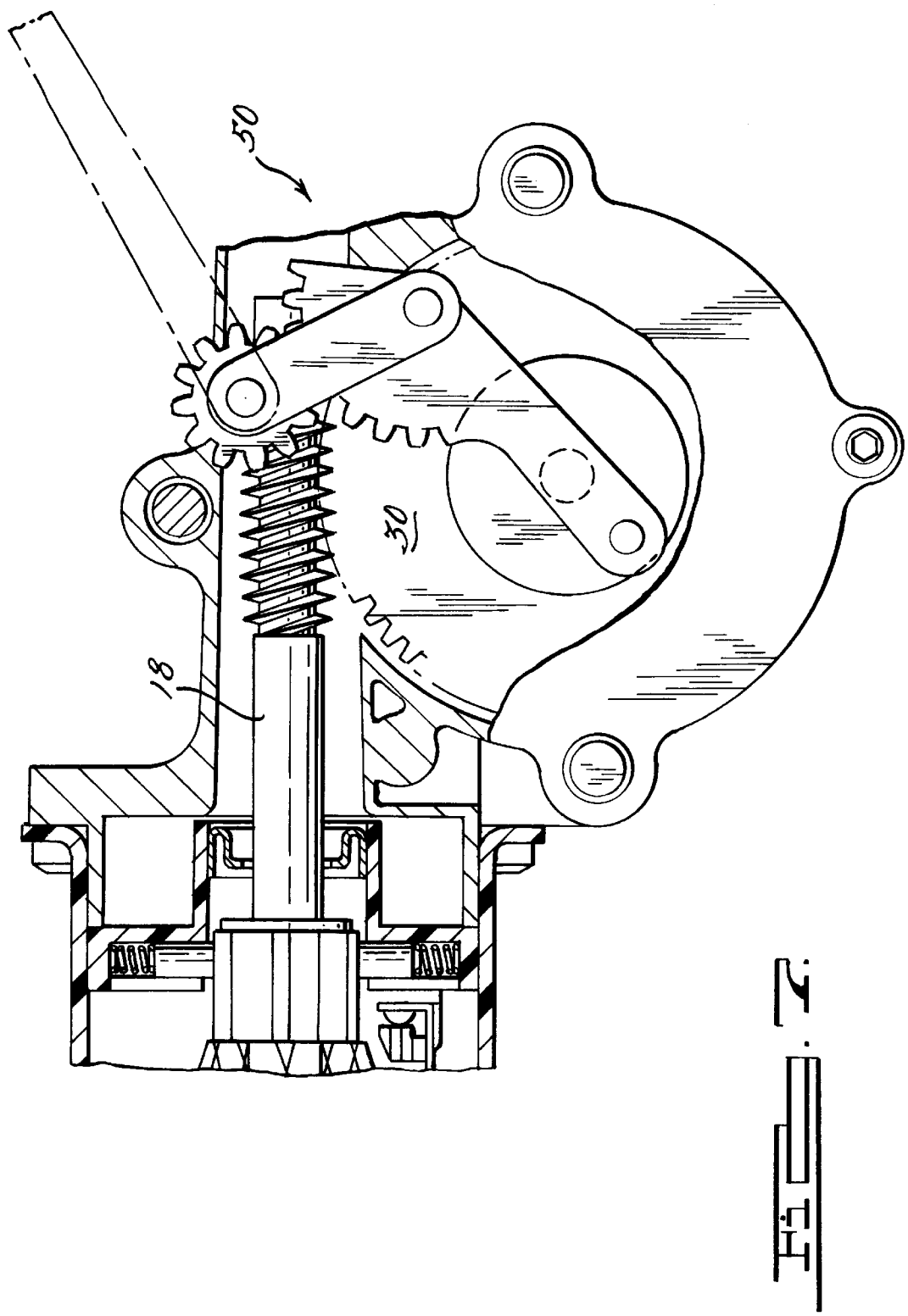

ROTARY AND LINEAR TRANSLATION ACTUATOR PERFORMING MULTI-FUNCTIONS IN AN AUTOMOBILE

BACKGROUND OF THE INVENTION

This invention relates generally to multi-functional electronic devices and specifically to a multi-functional electronic actuator for actuating multiple independent systems on an automotive vehicle.

Automotive vehicles typically incorporate a number of electronically powered systems such as windshield wiper assemblies, power windows, power door locks, power mirror adjustment mechanisms, etc.

Wiper assemblies traditionally include rubber wiper blades mounted on claw brackets which are pivotally attached to wiper arms that are mounted upon rotating shafts. The shafts are either directly driven by separate electric motors or are driven by a single electric motor which actuates a series or parallel-coupled four bar linkage mechanism.

Window wiper assemblies may be employed for the cleaning of rear windows of automotive vehicles. These types of rear window wiper assemblies typically include a wiper blade mounted upon a bracket which is coupled to a wiper arm. The wiper arm is attached to a wiper shaft rotatably driven in a cyclical oscillating manner by a helical gear. A reversible, fractional horsepower, direct current electric motor actuates the helical gear through an armature shaft-mounted worm gear in toothed engagement therewith. This type of rear window wiper arrangement is usually mounted upon a pivoting liftgate of a minivan, station wagon, sport-utility vehicle or the like. One example of such a window wiper arrangement is disclosed in U.S. Pat. No. 5,519,258 entitled "System and Method for Controlling Vehicle Lift Gate Window Wiper" which issued to Stroven et al. on May 21, 1996.

Some vehicles also provide a rear window release lock or latch, actuated by a solenoid, which can be unlocked to allow for upward pivotal movement of a rear window with respect to the otherwise stationary liftgate. A independently operable liftgate lock is often mounted to the liftgate door for fastening the liftgate to the body to prevent the inadvertent opening of the liftgate. This liftgate lock is traditionally operated by manual key or handle rotation, or may be operated through a separate electric motor or solenoid.

Separate motors or solenoids are commonly needed to actuate the various lock mechanisms and the window wiper mechanism. The traditional need for a multitude of electromagnetic devices has increased the weight and cost of automotive vehicles while creating packaging difficulties within the often small spaces available to place the mechanism. The added weight of the multiple electronic actuators is especially detrimental when the window wiper mechanism, rear window lock and liftgate lock, as well as their separate respective electromagnetic actuating devices, are all incorporated within the pivoting liftgate. Not only is the price increased due to this multiplicity of electromagnetic devices, but the assembly cost, part number proliferation and handling costs, electric wiring costs, objectional motor noise, and failure modes are substantially increased.

Certain types of electronic devices that provide multiple functions in an automotive environment are known. U.S. Pat. No. 3,688,332 entitled "Mechanism for Opening and Closing a Cover for a Concealed Windshield Wiper System" which issued to Bellware on Sep. 5, 1972, for instance, discloses a windshield wiper driven by an electric motor and an interruptible driving connection controlled by a separate electromagnet. This device employs levers and pivot pins to open and close a cover.

WO 96/33891 entitled "Multi-Functional Apparatus Employing an Intermittent Motion Mechanism," WO 96/33893 entitled "Multi-Functional Apparatus Employing an Electromagnetic Device," and WO 96/33892 entitled "Control System for an Automotive Vehicle Multi-Functional Apparatus," all of which were published on Oct. 31, 1996 and are incorporated herein by reference, disclose an improved system in which a single electromagnetic device can selectively operate a number of independent systems on an automotive vehicle such as a window wiper, a door lock, a window release lock and the like. Notwithstanding this, these devices require further refinement and improvement. For example, if the window wiper is frozen onto a window, the door could not be unlocked, with the geneva and starwheel mechanism constructions shown.

Similar issues are present in door assemblies that have more than one electronically powered system. For instance, power window regulator assemblies are typically driven by an electric motor and the power lock system is driven by a separate electronic actuator, such as a solenoid.

SUMMARY OF THE INVENTION

In accordance with the present invention, the preferred embodiment of a multi-functional electronic actuator includes a device housing, a magnet assembly connected to the device housing, a rotor mounted within the magnet assembly with an armature and a shaft that rotates when the armature is energized, a device for actuating a first independent system on the automotive vehicle utilizing the rotational motion of the shaft, a device for translating the rotor with respect to the magnet assembly, and a device for actuating a second independent system on the automotive vehicle utilizing the translation of the rotor shaft with respect to the magnet assembly.

Two methods for translating the rotor with respect to the magnet assembly are described. In the first method, an additional length of useable gearing is added to the shaft of a conventional electric drive motor, the shaft is allowed to move within the device housing, and movement force acting to translate the shaft is created by the interaction between the gearing on the rotor shaft and the gearing used to drive the first independent system as the shaft is rotated by the motor. In the second method, the magnet assembly is mounted in a translatable fashion on the device housing and the armature of the rotor is energized in such a manner to create axial magnetic forces between the rotor and the magnet assembly which generates a movement force on the magnet assembly. In this method, the rotor does not translate with respect to the device housing and the translation of the magnet assembly with respect to the device housing is used to actuate the second independent system on the automotive vehicle.

Typical first independent systems on the automotive vehicle include windshield wiper mechanisms and window regulator mechanisms. Typical second independent systems on the automotive vehicle include latches and power locks. A wide variety of mechanisms and linkages for utilizing the rotational motion of the shaft to actuate the first independent system are possible, including those systems that are intended to utilize a reversing motor and those that are intended to utilize a motor that rotates in only a single direction.

Additional advantages and features of the present invention will become apparent from the following description and appended claims, taken in conjunction with the accompanying drawings.

BRIEF DESCRIPTION OF THE DRAWINGS

FIG. 4 is a sectional view showing the preferred embodiment apparatus having multiple translational actuator mechanisms;

FIG. 5 is a diagrammetric view showing a pair of cams on the flexible coupling of the preferred embodiment apparatus in an untranslated position;

FIG. 6 is a diagrammetric view showing the pair of cams on the flexible coupling of the preferred embodiment apparatus from FIG. 5 in a translated position;

FIG. 7 is a sectional view showing the preferred embodiment apparatus with an alternative windshield wiper drive mechanism;

FIG. 10 is a partial sectional view through an alternative preferred embodiment of the apparatus.

DETAILED DESCRIPTION OF THE PREFERRED EMBODIMENT

Figure 1:
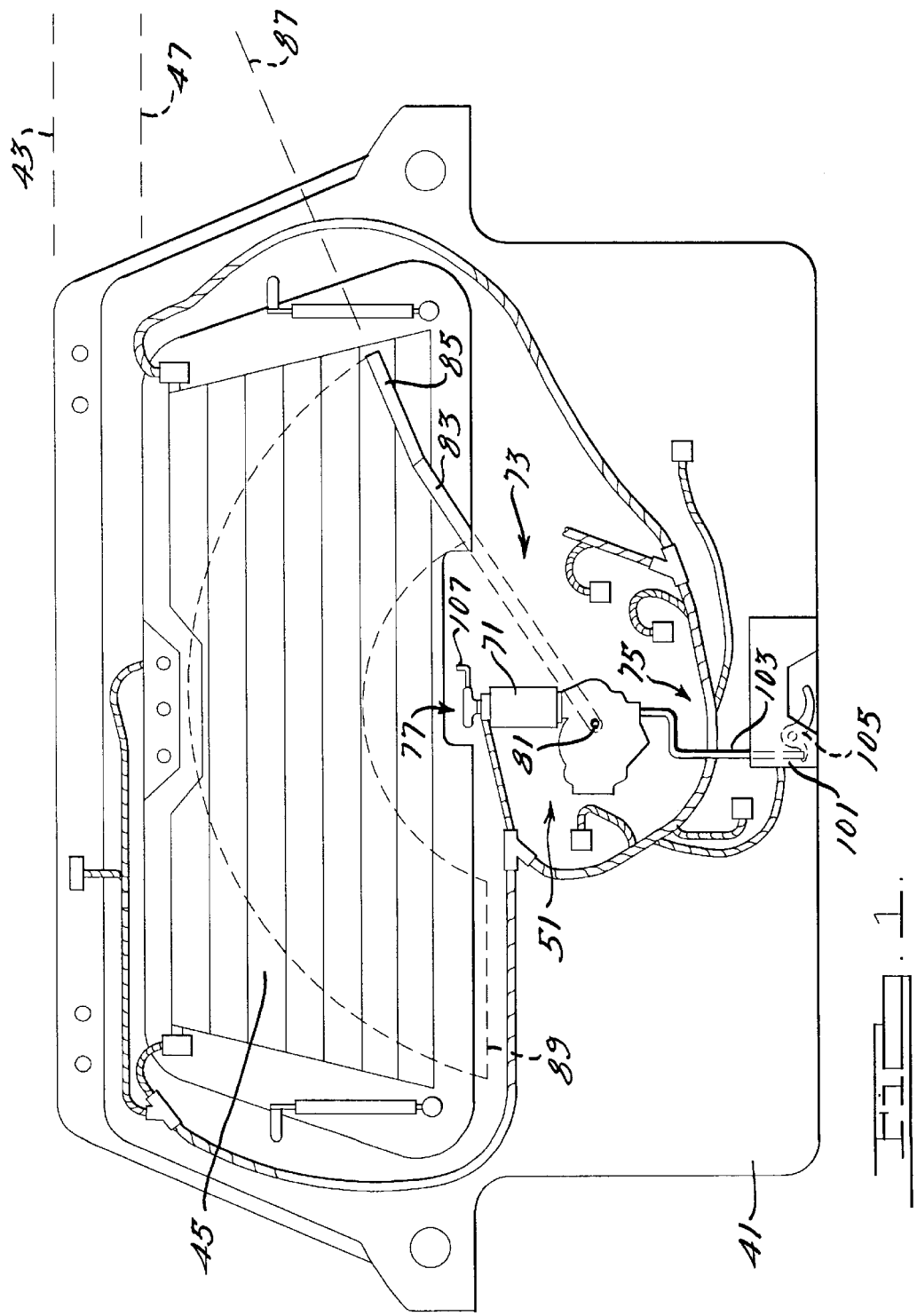
FIG. 1 is a front elevational view showing the preferred embodiment of the apparatus of the present invention installed in a liftgate door.

FIG. 1 shows a rear liftgate door 41 for an automotive vehicle, such as a minivan, sport utility vehicle or the like, which can pivot about a generally horizontal, hinging pivot axis 43. When the liftgate is pivoted to an open position, a cargo space or passenger compartment is accessible from behind the vehicle. Liftgate 41 has a rear window 45 which is pivotable between a closed position, substantially flush with the outer surface of liftgate 41, to an open position, about a generally horizontal pivot axis 47.

The preferred embodiment of a multi-functional electronic actuator 51 of the present invention is mounted upon an inner surface of liftgate 41. The majority of the actuator 51 is hidden by an interior trim panel (not shown). Referring to FIGS. 1 through 5, the multi-functional actuator 51 includes a fractional horsepower, direct current electric motor 71, a first independent system 73, a second independent system 75 and a third independent system 77. The first independent system 73, the window wiping system, consists of a window wiper shaft 81 that is coupled to a gear by an intermittent motion mechanism for rotating a rear window wiper arm 83 and wiper blade 85 in an oscillating manner from a first wiping position 89 to a second wiping position 87 on the window 45.

The second independent system 75, the liftgate latch release system, couples a liftgate door panel lock 101 to the actuator 51. More specifically, a door lock linkage 103 serves to rotate a hook-like or bifurcated latch 105 in response to actuation of the second independent system 75 by the actuator 51. Various lost motion linkages can also be employed between linkage 103 and latch 105. A window panel lock or latch 107 is also coupled to the actuator 51 by the third independent system 77. Actuation of the third independent system 77 releases the window lock 107 and allows the window 45 to be opened.

Figure 2:
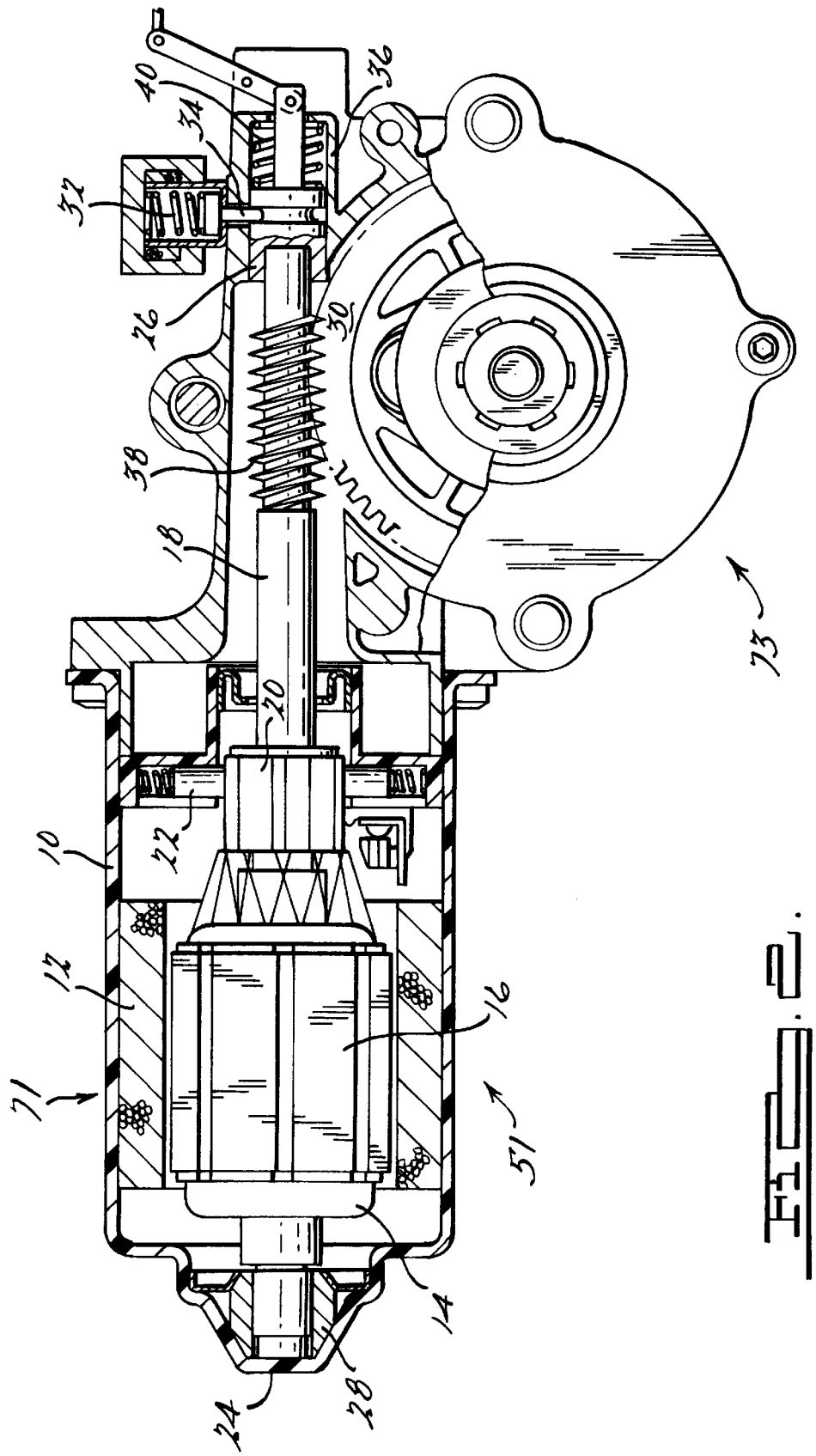
FIG. 2 is a sectional view showing the preferred embodiment apparatus in a locked position.

A sectional view through the actuator 51 is shown in FIG. 2. The primary components of the electric motor 71 will be familiar to those of ordinary skill in the art. A device housing 10 encases the entire electric motor 71. Mounted within the device housing 10 is a magnet assembly 12 and a rotor assembly 14. The rotor assembly 14 comprises an armature 16 on a shaft 18. The armature 16 is in electrical contact with a commutator 20, a set of brushes 22, and associated electrical circuitry that energize the armature 16 and produce a magnetic field that reacts with the magnetic field produced by the magnet assembly 12 and causes the armature 16 and the shaft 18 to rotate about an axis of rotation. In FIG. 2, the shaft 18 is prevented from translating with respect to the device housing 10 by an end cap 24 of the device housing 10 and by a restraint collar 26. The bushing 28 adjacent to the end cap 24 and the restraint collar 26 allow the shaft 16 to rotate freely about the axis of rotation. In this position, the rotation of the shaft 16 produces a rotational movement in a gear 30 that is a component of the first independent system 73, in this case a window wiper system. In this mode, the rotational motion of the shaft 16 is used to actuate the first independent system 73 on the automotive vehicle. The gear 30 may, for instance, be coupled to the window wiper shaft and this coupling could be accomplished by the type of gearing and split shaft/clutch arrangement described in U.S. application Ser. No. 08/431,148 entitled "Multi-Functional Apparatus Employing an Electromagnetic Device" by H. Winston Maue and Eric J. Krupp. In a device utilizing this type of gearing arrangement, the reciprocating motion of the windshield wiper is produced by driving the motor first forward and then in reverse. The components of the multi-functional electronic actuator 51 described thus far operate in a conventional manner.

To actuate the second independent system 75 on the automotive vehicle, in this case the liftgate latch release system, a solenoid 32 is actuated that removes a retaining pin 34 from the restraint collar 26. Removing the retaining pin 34 from the restraint collar 26 allows the restraint collar to move freely within a housing extension 36. If the shaft 16 is rotated in the proper direction after the retaining pin 34 has been removed from the restraint collar 26, the rotation of the worm screw threads 38 with respect to the gear 30 will produce an axial movement force on the shaft in the vicinity of the worm screw thread that will overcome the biasing force on the restraint collar 26 introduced by return spring 40 and will move the shaft 18 toward the housing extension 36. The result of such movement is shown in FIG. 3.

Figure 3:
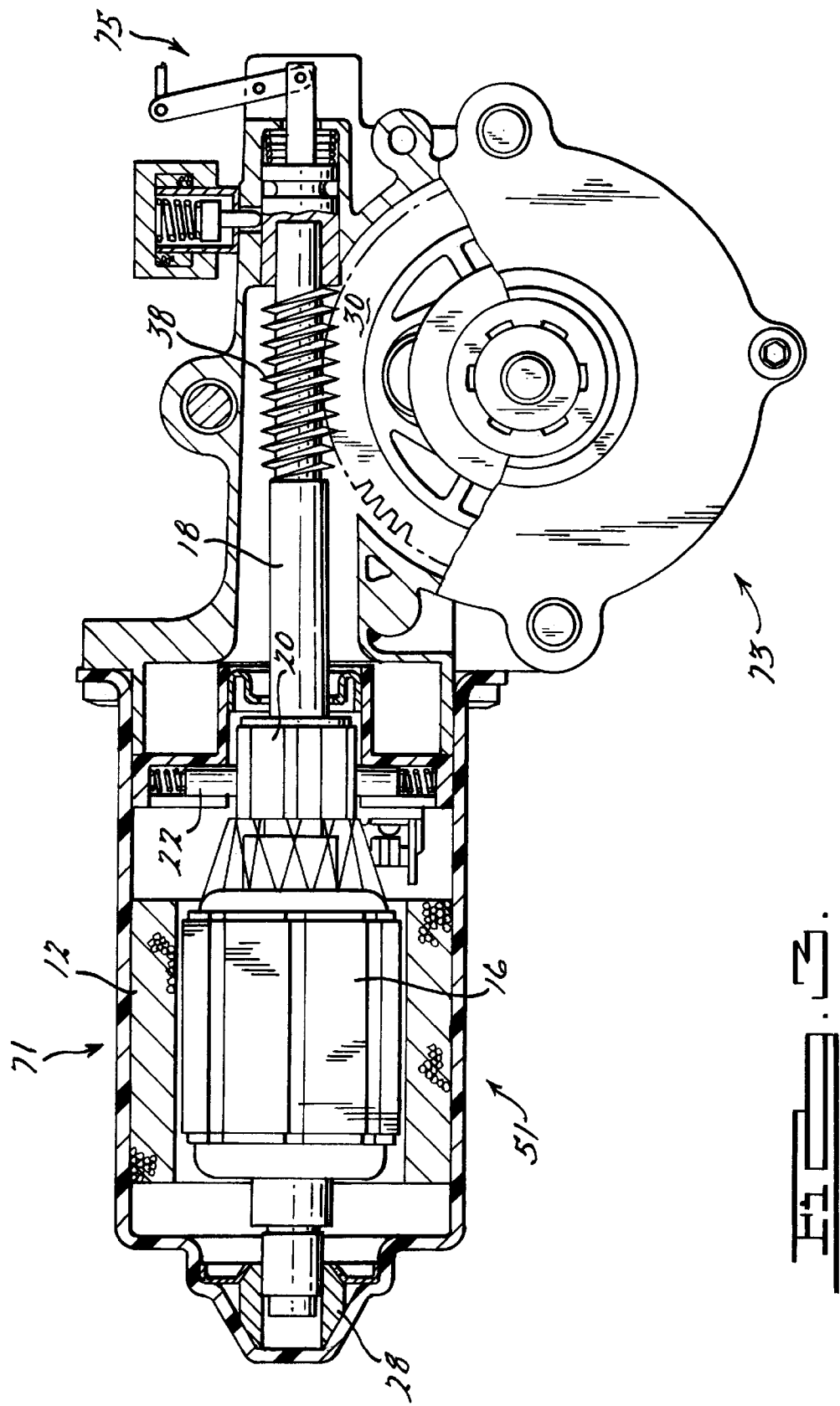
FIG. 3 is a sectional view showing the preferred embodiment apparatus disposed in an unlocked and translated position.

In FIG. 3, the shaft 18 has been translated with respect to the device housing 10, the magnet assembly 12, and the gear 30. Attached to the restraint collar 26 are the components of the second independent system 75 on the automotive vehicle, the liftgate latch release system. The linkages in the second independent system 75 rotate the liftgate latch 105 and allow the liftgate to be opened.

It can be seen in FIG. 2 that some design modifications to conventional window wiper motor systems are required to allow the actuator 51 to function properly. The bushing 28 must be long enough to properly restrain the end of the drive shaft 18 throughout its entire range of travel. To maintain optimal electromagnetic force field characteristics, the magnet assembly 12 should be lengthened so that the armature 16 remains within the magnet assembly throughout its entire range of travel. The commutator 20 must also be widened to allow the armature to maintain constant contact with the brushes 22. The length of the worm screw threads 38 on the shaft 18 must also be increased to allow for the translation of the shaft with respect to the gear 30.

Other types of restraining devices could be substituted from the solenoid 32 and the retaining pin 34, including a locking catch using a bimetallic heating movement or through the use of a mechanical latch that uses a high torque event to release the latching mechanism. A one way clutch can also be disposed on the gear 30 to prevent the gear from being backdriven.

An alternative embodiment of the inventive multi-functional electronic actuator 51 is shown in FIG. 4. FIG. 4 demonstrates one method in which the actuator 51 can operate multiple independent systems in the translated position. In this embodiment, the mechanism utilized by the first independent system 73 requires the gear to rotate in a single direction and the motor 71 is not required to reverse directions to operate the first independent system. This allows the shaft 18 to remain in a single "rest" position without the use of a solenoid/retaining pin or any similar restraining device. The shaft 18 in FIG. 4 is attached to a flexible coupling 42 in the vicinity of the bushing 28. When the shaft 18 is shifted from the nontranslated position shown in FIG. 4 to the fully translated position, the components of the second independent system 75 would be actuated, as discussed above. The flexible coupling 42 would also be translated, which could be used to actuate additional independent systems as shown in FIG. 5.

FIG. 5 shows the end of flexible coupling 42 opposite motor 71 in an untranslated position. Attached to flexible coupling 42 are a pair of actuation cams 44 that are shown in diagrammatic fashion. As shown are a first system actuation device 46 and a second system actuation device 48. As can be seen in FIG. 5, when the flexible coupling 42 attached to the shaft 18 is in the untranslated position, the actuation cams 44 are unable to contact the first system actuation device 46 or the second system actuation device 48, regardless of their rotational position.

When the flexible coupling 42 has been moved to the translated position, as shown in FIG. 6, the actuation cams 44 are able to contact the first system actuation device 46 and the second system actuation device 48 and thereby actuate their associated independent systems. The actuation cams 44, the first system actuation device 46 and the second system actuation device 48 may be arranged in such a manner that one actuation cam 44 contacts the first system actuation device 46 in one range of rotational motion of the flexible coupling 42 and the other actuation cam 44 contacts the second system actuation device 48 in a different range of rotational motion of the flexible coupling 42. This allows selective actuation of the actuation devices by controlling the motion of the flexible coupling 42 after it has been moved to the translated position.

Another type of mechanism that could be used with the inventive multi-functional electronic actuator 51 is shown in FIG. 7. In FIG. 7, the shaft drives a gear 30 that drives a four-bar linkage mechanism 50. This type of mechanism produces an oscillating motion (to drive a windshield wiper system for instance) from the continuous motion of the gear 30 in a single direction.

U.S. Pat. No. 5,182,957, entitled "Drive Unit, In Particular For A Windshield Wiper System On A Motor Vehicle" issued on Feb. 2, 1993 to Bohmer et al., which is incorporated herein by reference, discloses a very similar 4 bar linkage that could be used with the inventive actuator 51 as a first independent system to produce oscillating windshield wiper motion through the use of an unidirectional worm gear.

Figure 8:
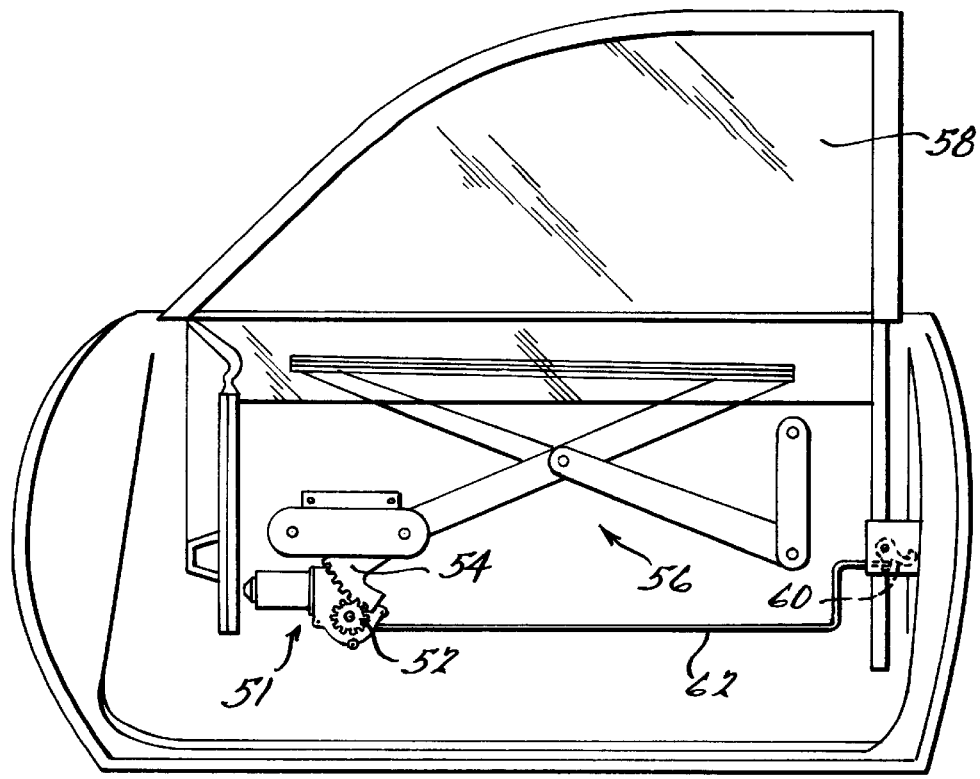
FIG. 8 is a sectional view showing the preferred embodiment apparatus with an example window regulator mechanism.

FIG. 8 shows two additional types of mechanisms that could be actuated by the inventive actuator 51. In this embodiment, the rotational motion of the shaft 18 is transmitted to a drive gear 52 which is meshingly engaged with a sector gear 54. The movement of the sector gear 54 with respect to the drive gear 52 causes the scissors type window regulator mechanism 56 to raise or lower door glass 58. The actuator 51 is also coupled to a door latch 60 by linkage 62. The translation of the shaft 18 could, in a similar manner, open the door latch 60. In this embodiment, the window regulator system is the first independent system and the door latch release is the second independent system.

In the systems discussed thus far, the means for generating a movement force that translates the rotor assembly 14 with respect to the magnet assembly 12 has been the interaction between the worm screw threads 38 and the gear 30. An additional method can also be used to produce this type of movement force.

Figure 9:
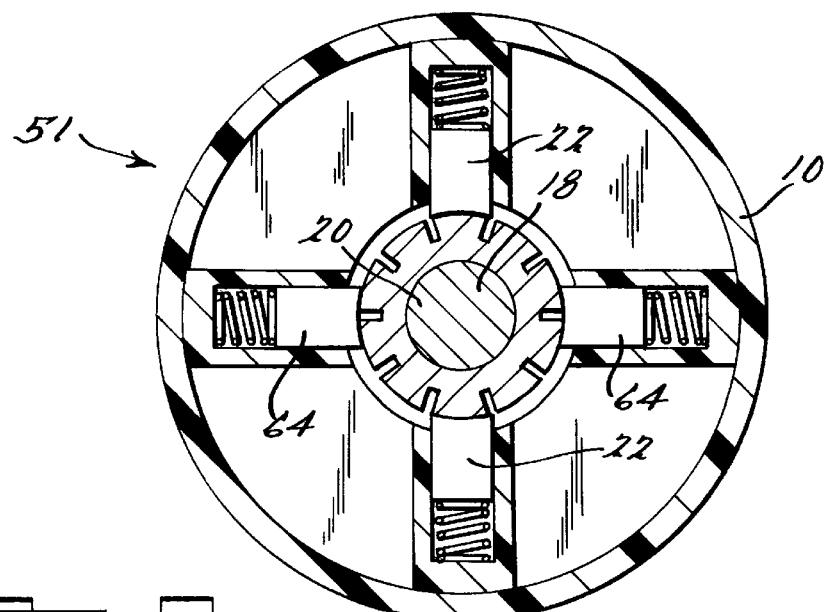
FIG. 9 is a sectional view through the commutator of an alternative preferred embodiment of the apparatus.

FIG. 9 shows a sectional view through an alternative preferred embodiment of the multi-functional electronic actuator 51 showing the shaft 18, the commutator 20, and the original set of brushes 22. Added to this embodiment are a set of additional brushes 64. If the set of additional brushes 64 are properly energized, the armature 16 will form a magnetic field substantially parallel and magnetically opposite to the magnetic field created by the magnet assembly 12. These parallel magnetic fields will produce an axial attraction force between the rotor assembly 14 and the magnet assembly 12. If the magnet assembly 12 is allowed to translate with respect to the device housing 10, the axial force will generate a movement force that acts on the magnet assembly and translates the magnet assembly with respect to the rotor assembly 14 and the device housing.

FIG. 10 shows a partial sectional view of the alternative preferred embodiment of the inventive actuator 51. In this embodiment, the magnet assembly 12 is fixed to a translatable sleeve 66 located within the device housing 10. When the additional brushes 64 are properly actuated, an attractive magnet force field is produced between the armature 16 and the magnet assembly 12 that generates a movement force that acts on the magnet assembly and translates the magnet assembly with respect to the rotor assembly 14 and the device housing 10. As can be seen in this embodiment, the magnet assembly 12 must be positioned so that the magnet assembly is either slightly offset or more dramatically offset from the magnet field created by the armature 16. Connected to the sleeve 66 is a second independent system linkage 68 and a return spring 70. The force acting to translate the magnet assembly 12 with respect to the armature 16 and rotor assembly 14 can be used to actuate a second independent system on an automotive vehicle in a like manner to the other systems described above. The return spring 70 is used to bias the magnet assembly 12 to the untranslated position.

A primary benefit obtained using the translating magnet assembly 12 approach is that the shaft 18 does not shift with respect to the device housing 10. This allows more efficient bearings to be used (instead of simple bushings) and allows simpler and more efficient gear systems to be used because the gears will not be subjected to translational relative movement.

While the electric motor 71 described was shown as a conventional DC motor, it should be understood that the disclosed technology would also work with brushless DC motors.

Various materials have been disclosed in an exemplary fashion, however, other materials may of course be employed. It is intended by the following claims to cover these and any other departures from the disclosed embodiments which fall within the true spirit of this invention.

The invention claimed is:

1. An automotive device comprising:
    a first independent automotive system having a rotatable input member;
    a second independent automotive system;
    a third independent automotive system;
    a housing adapted to be mounted in an automobile;
    a magnet assembly disposed in said housing;
    a rotor rotatably mounted adjacent said magnet assembly, said rotor having an armature fixed to a shaft for rotation therewith, said shaft engaging said rotatable input member of said first independent automotive system;
    a first set of brushes electrically coupled with said armature, said first set of brushes being selectively energized to rotate said armature and said shaft about a rotation axis to rotatably drive said first independent automotive system;
    a second set of brushes electrically coupled with said armature, said second set of brushes being selectively energized to linearly drive said shaft of said rotor to linearly actuate said second independent automotive system; and
    a coupling member coupled to said shaft of said rotor for rotation and translation therewith, said coupling member linearly engagable to rotatably actuate said third independent automotive system upon energization of one of said sets of brushes.

2. The automotive device according to claim 1 wherein said input member of said first independent automotive system is a gear and said shaft includes a threaded portion driving said gear when said rotor rotates in said forward direction.

3. The automotive device according to claim 1, further comprising:
    a cam disposed on a surface of said coupling member, said cam actuating said third independent automotive system in response to rotation of said rotor.

4. The automotive device according to claim 1 wherein said first independent automotive system is a winshield wiper mechanism.

5. The automotive device according to claim 1 wherein said second independent automotive system is a window lock mechanism.

6. The automotice device according to claim 1 wherein said third independent automotive system is a latch.

7. An automotive device for actuating at least two independent systems of a vehicle, said automotive device comprising:
    a housing;
    a magnet assembly disposed in said housing;
    a rotor rotatably mounted adjacent said magnet assembly, said rotor having an armature fixed to a shaft for rotation therewith;
    a first set of brushes electrically coupled with said armature, said first set of brushes being selectively energized to rotate said armature and said shaft about a rotation axis, said rotation of said shaft adapted to rotatably drive a component of a first of the independent automotive systems;
    a second set of brushes electrically coupled with said armature, said second set of brushes being selectively energized to linearly translate said shaft of said rotor relative to said magnet assembly to linearly actuate a component of a second of the independent automotive systems; and
    a retainer positionable in an engaged and a disengaged position, said retainer being operable in said engaged position to retain said rotor in a predetermined axial position, said retainer being operable in said disengaged position to enable said rotor to linearly translate relative to said magnet assembly in response to energization of one of said sets of brushes.

8. The automotive device according to claim 7 wherein said retainer comprises:
    a pin engagable with said shaft of said rotor; and
    an electrical actuation device coupled with said pin, said electrical actuation device selectively engaging said pin with said shaft to prevent said rotor from linearly translating.

9. The automotive device according to claim 8 wherein said electrical actuation device is a solenoid.

10. The automotive device according to claim 7 wherein said component of said first of the independent automotive systems is a gear and said shaft includes a threaded portion adapted to drivingly engage said gear such that rotation of said shaft rotates said gear to drive said first of the independent automotive systems.

11. The automotive device according to claim 7, further comprising:
    a spring being disposed in said housing, said spring biasing said shaft in an untranslated position.

12. The automotive device according to claim 11, further comprising:
    a collar being mounted to an end of said shaft, said collar being slidably disposed in said housing adjacent said spring.

* * * * *